United States Patent [19]
Abe et al.

[11] Patent Number: 5,651,088
[45] Date of Patent: Jul. 22, 1997

[54] RESISTIVE HONEYCOMB HEATER HAVING LOCALLY QUICKLY HEATED REGIONS FOR USE IN AN EXHAUST GAS PURIFICATION SYSTEM

[75] Inventors: Fumio Abe, Handa; Shigeharu Hashimoto, Okazaki; Tomoharu Kondo, Toki, all of Japan

[73] Assignee: NGK Insulators, Ltd., Japan

[21] Appl. No.: 357,213

[22] Filed: Dec. 13, 1994

[30] Foreign Application Priority Data

Dec. 14, 1993 [JP] Japan ................ 5-313754

[51] Int. Cl.$^6$ ................ F01N 3/28; H05B 3/00
[52] U.S. Cl. ................ 392/494; 219/552; 60/300; 422/174
[58] Field of Search ................ 392/480, 494, 392/485, 486, 488, 491, 493; 60/300; 219/552, 553, 505; 422/174, 177, 179; 55/DIG. 30

[56] References Cited

U.S. PATENT DOCUMENTS

| | | | |
|---|---|---|---|
| 5,063,029 | 11/1991 | Mizuno et al. | 422/175 |
| 5,194,229 | 3/1993 | Abe et al. | 422/174 |
| 5,202,548 | 4/1993 | Kondo et al. | 219/552 |
| 5,229,079 | 7/1993 | Harada et al. | 422/174 |
| 5,234,668 | 8/1993 | Harada et al. | 422/174 |
| 5,254,840 | 10/1993 | Thompson | 219/544 |
| 5,393,586 | 2/1995 | Lipp | 428/116 |
| 5,399,841 | 3/1995 | Abe et al. | 219/552 |

FOREIGN PATENT DOCUMENTS

| | | | |
|---|---|---|---|
| 0452125 | 10/1991 | European Pat. Off. | B22F 5/00 |
| 0465184 | 1/1992 | European Pat. Off. | H05B 3/14 |
| 0502731 | 9/1992 | European Pat. Off. | F01N 3/20 |

*Primary Examiner*—Teresa J. Walberg
*Assistant Examiner*—Thuy T. Dang
*Attorney, Agent, or Firm*—Parkhurst, Wendel & Burr, L.L.P.

[57] ABSTRACT

A honeycomb heater including a honeycomb structure, two electrodes and a plurality of slits extending through the honeycomb structure. The slits are provided to elongate a current flow path through the honeycomb structure and to define a plurality of first regions of partition walls and at least one second region of partition walls. The first regions are locally quickly heated with respect to at least one second region upon electrification of the honeycomb structure, and the first regions are spaced apart from each other. In addition, the first regions in total extend over an area 5 to 50% of a total cross-sectional area of the honeycomb structure. Alternatively, the honeycomb structure may include at least one first region and a plurality of second regions, the second regions being spaced apart by the at least one first region.

20 Claims, 15 Drawing Sheets

Fig. 5 (b)   Fig. 5 (a)   Fig. 5 (c)
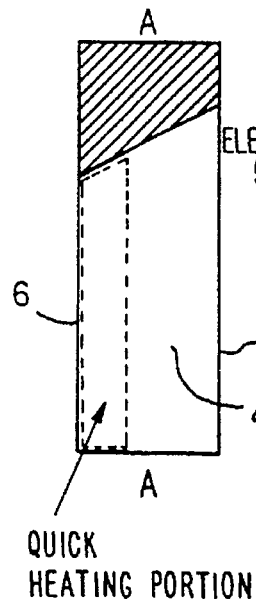
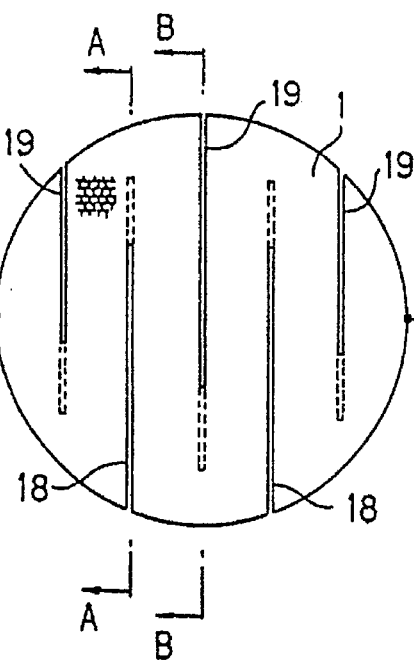
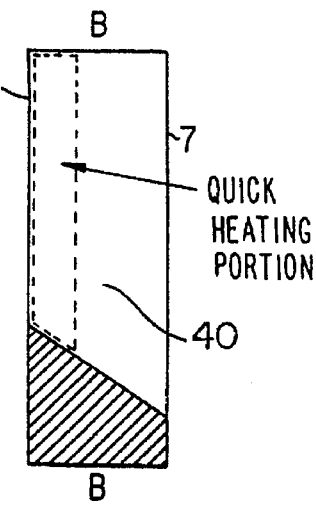

Fig. 6 (b)   Fig. 6 (a)   Fig. 6 (c)
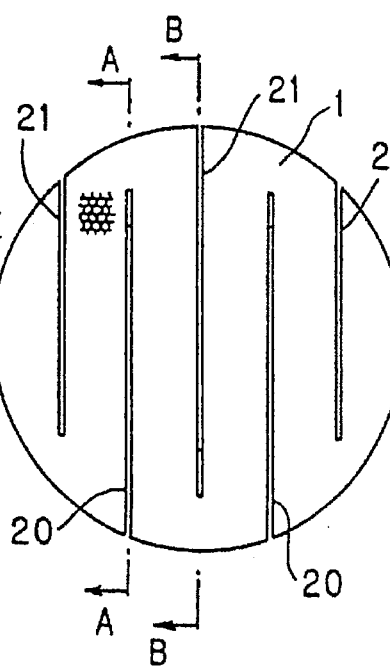
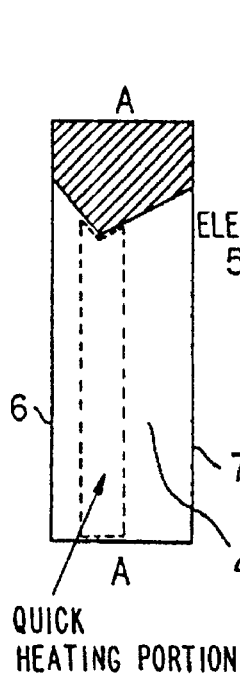
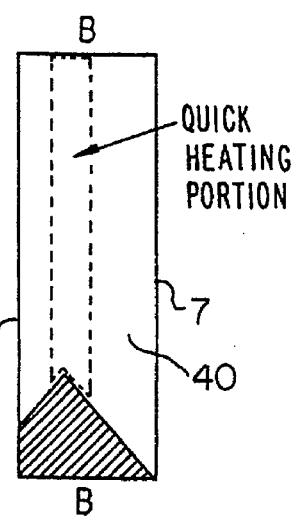

Fig. 1 3 (a)
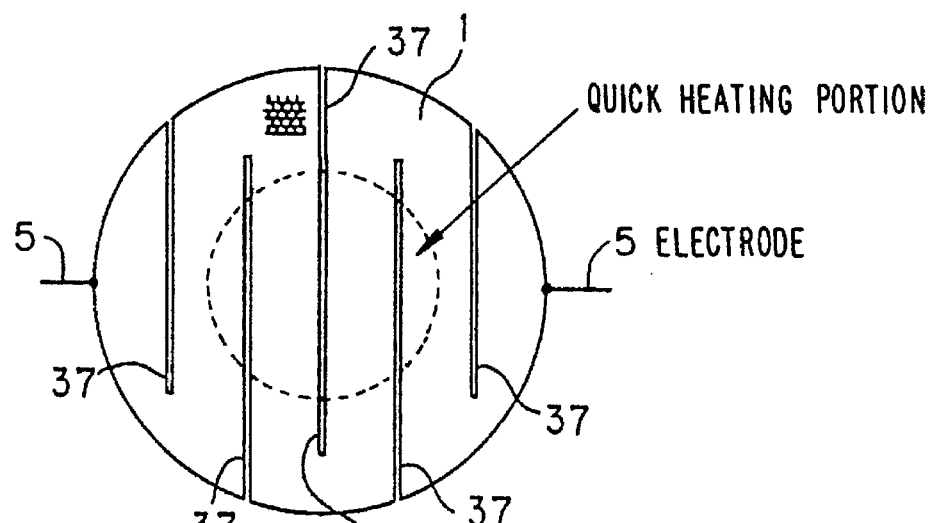
Fig. 1 3 (b)
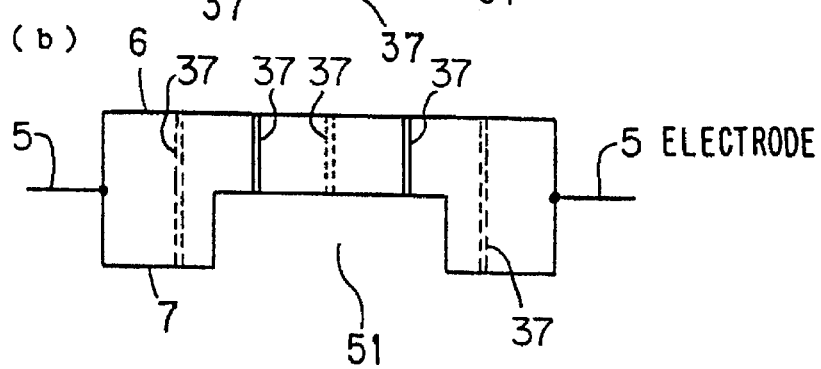

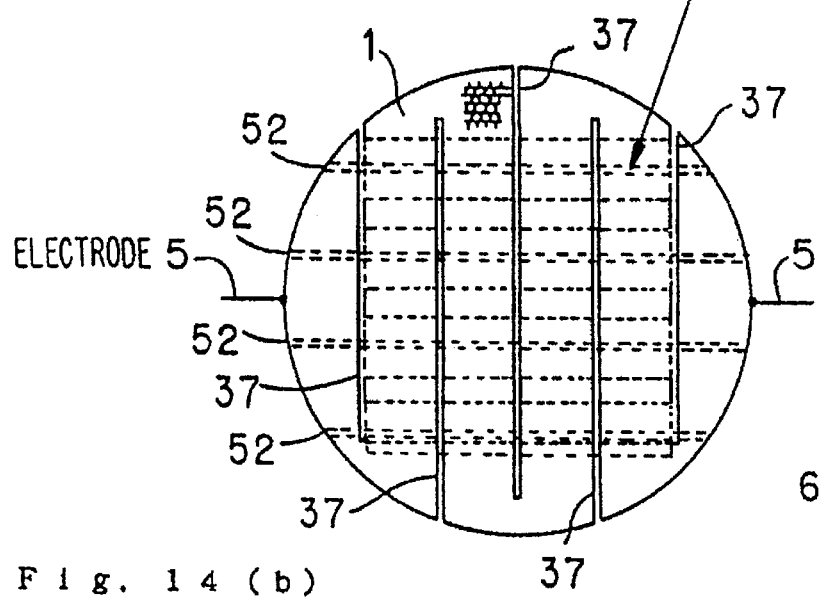
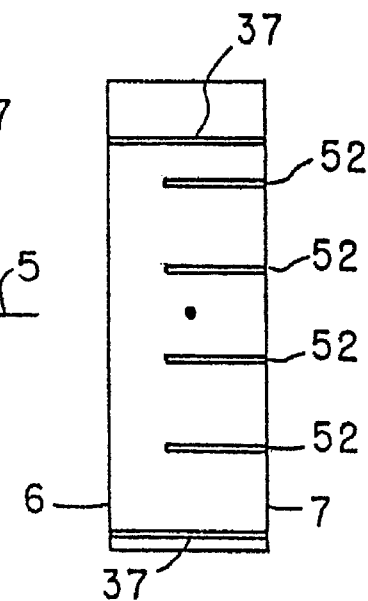
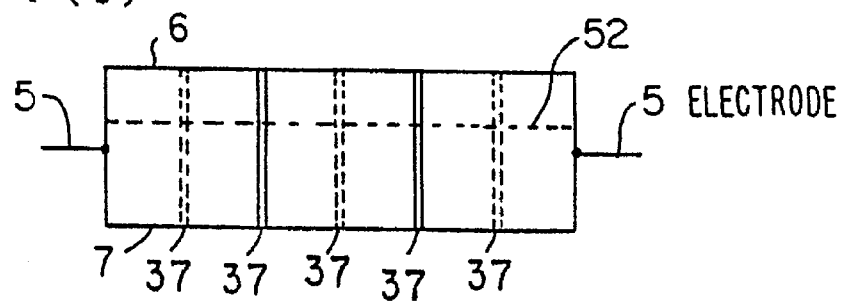

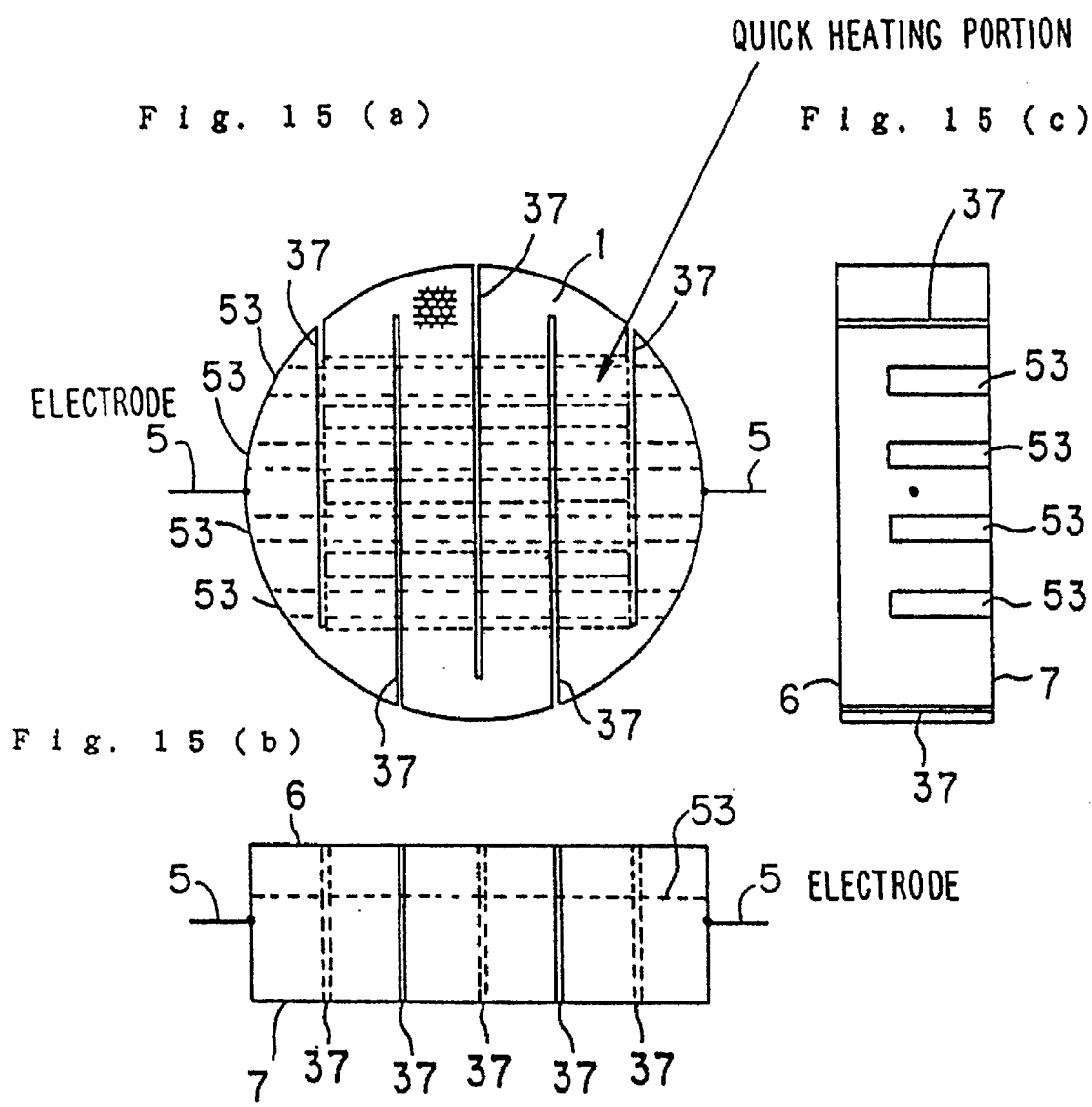

RESISTIVE HONEYCOMB HEATER HAVING LOCALLY QUICKLY HEATED REGIONS FOR USE IN AN EXHAUST GAS PURIFICATION SYSTEM

BACKGROUND OF THE INVENTION (i) Field of the Invention

The present invention relates to an electrical heating type honeycomb heater which can suitably be used in an exhaust gas purification system for effectively purifying harmful components such as hydrocarbons (HC), carbon monoxide (CO) and nitrogen oxides ($NO_x$) in an exhaust gas exhausted from an internal combustion engine, particularly HC generated in large quantities at the time of an engine start (at a cold start).

(ii) Description of the Prior Art

Heretofore, the research and development of an automobile exhaust gas purification system for purifying harmful components such as HC, CO and $NO_x$ in an exhaust gas of a car have been actively carried out, but particularly in recent years, the purification of these harmful substances at a cold start of a car has been an important technical theme with the intensification of exhaust gas regulations.

That is to say, when the temperature of such an exhaust gas as exhausted immediately after the start of an engine is low, a catalyst does not reach its functional temperature, and so the purification ability of the catalyst is poor. In addition, at this time, HC are exhausted in a larger amount than at the time during steady running.

As one means for solving such a technical problem, much attention has been paid to a technique in which an electrical heating type heater is electrified before or simultaneously with the start of the engine to quickly heat the catalyst supported on the heater, the so-called light-off catalyst and main catalyst and the like closely arranged in the rear of the heater up to the functional temperature of the catalysts.

For example, Japanese Patent Application Laid-open No. 295184/1991 which has been filed by the present applicant discloses a resistance adjustable type heater in which at least two electrodes for electrification are attached to a honeycomb structure having a number of passages, and a resistance adjusting means comprising slits or the like is provided between the electrodes.

However, in the resistance adjustable type heater described in Japanese Patent Application Laid-open No. 295184/1991, a heating rate low, when the whole heater is heated and low electric power is applied. Thus, the catalyst supported on the heater cannot reach an ignition temperature in a short period of time, with the result that most of HC generated in large quantities at the time of a cold start is passed through the catalyst without being purified. On the other hand, if a large electric power is applied to quickly heat the heater, a large-capacity battery, heavy cables and a control device are required.

SUMMARY OF THE INVENTION

In view of such conventional circumstances, the present invention has been completed. An object of the present invention is to provide a honeycomb heater which can exert a suitable purification performance by the application of low electric power.

For the achievement of the above-mentioned object, according to the present invention, there is provided a honeycomb heater comprising a honeycomb structure which is made of a conductive material and which has a number of passages substantially parallel to a gas flow direction partitioned by partition walls and which has both end surfaces on a gas inlet side and a gas outlet side as well as an outer periphery, and at least two electrodes for electrification provided on the honeycomb structure, the honeycomb heater being characterized in that a plurality of slits are formed in a direction of the passages between the electrodes of the honeycomb structure so that a current flow path may be prolonged, whereby resistance is adjusted; and one or more of a slit forming position, a slit length and a space between each pair of slits are adjusted so that a specific region of the honeycomb heater may be locally heated more quickly as compared with the other region at the time of the electrification.

As described above, the present invention is connected to a partial heating type (a local heating type) honeycomb heater in which slits are formed as a means for adjusting resistance, and one or more of a slit forming position, a slit length and a space between each pair of slits are adjusted so that a specific region of the honeycomb heater may be locally heated more quickly as compared with the other region at the time of the electrification.

The honeycomb heater of the present invention which is used for the purpose of purifying an exhaust gas can usually preferably be utilized in a condition where a catalyst layer is supported on the partition walls of the fundamental honeycomb structure, as described hereinafter. Furthermore, the honeycomb heater is provided with a specific region which can be locally quickly heated (this region will be hereinafter referred to as "the quick heating portion", and the other region will be referred to as "the slow heating portion") as described above, whereby the catalyst layer supported on this region can be promptly ignited with a relatively low electric power, and heat of reaction obtained by this catalytic reaction accelerates the heating of the whole honeycomb heater, a light-off catalyst and a main catalyst which are usually arranged on the downstream side of this heater. Therefore, when the heater of the present invention is used, harmful substances in the exhaust gas, particularly HC generated in large quantities at the time of the cold start can be effectively purified with the low electric power.

BRIEF DESCRIPTION OF THE DRAWINGS

FIG. 1(a) is a plan view, and FIG. 1(b) is a front view.

FIG. 2(a) is a plan view, and FIG. 2(b) is a front view.

FIGS. 5(a), 5(b) and 5(c) are illustrative views showing one embodiment of the present invention. FIG. 5(a) is a plan view, FIG. 5(b) is a sectional view taken along the line A—A of FIG. 5(a), and FIG. 5(c) is a sectional view taken along the line B—B of FIG. 5(a).

FIGS. 6(a), 6(b) and 6(c) are illustrative views showing one embodiment of the present invention. FIG. 6(a) is a plan view, FIG. 6(b) is a sectional view taken along the line A—A of FIG. 6(a), and FIG. 6(c) is a sectional view taken along the line B—B of FIG. 6(a).

FIG. 9(a) is a plan view, and FIG. 9(b) is a front view.

FIG. 10(a) is a plan view, and FIGS. 10(b) and 10(c) are partially enlarged views.

FIG. 11(a) is a plan view, and FIGS. 11(b), 11(c) and 11(d) are partially enlarged views.

FIG. 12(a) is a plan view, and FIG. 12(b) is a front view.

FIGS. 13(a) and 13(b) are illustrative views showing a conventional known resistance adjustment means which can be used together with the present invention. FIG. 13(a) is a plan view, and FIG. 13(b) is a cross-sectional view.

FIGS. 14(a), 14(b) and 14(c) are illustrative views showing a conventional known resistance adjustment means which can be used together with the present invention. FIG. 14(a) is a plan view, FIG. 14(b) is a front view, and FIG. 14(c) is a side view.

FIGS. 15(a), 15(b) and 15(c) are illustrative views showing a conventional known resistance adjustment means which can be used together with the present invention. FIG. 15(a) is a plan view, FIG. 15(b) is a front view, and FIG. 15(c) is a side view.

FIG. 16(a) is a plan view, and FIG. 16(b) is a front view.

DESCRIPTION OF THE PREFERRED EMBODIMENTS

Figure 1:
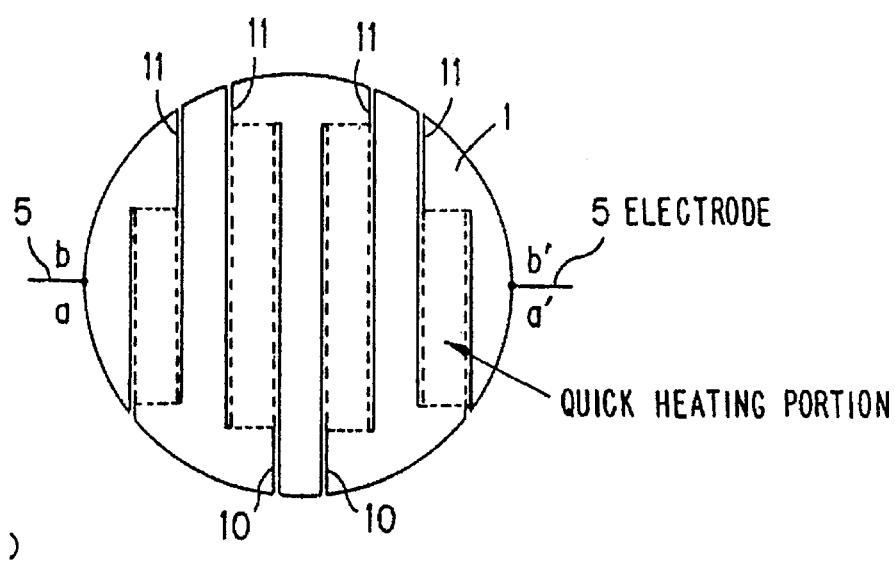
FIGS. 1(a) and 1(b) are illustrative views showing one embodiment of the present invention.
Figure 1:
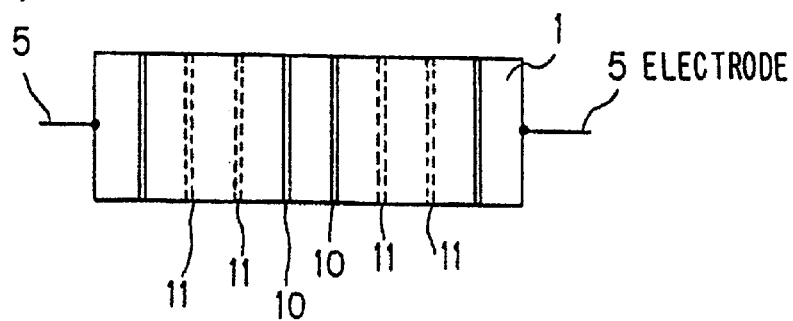

Now, the present invention will be described in more detail.

In the present invention, a honeycomb structure is made of a conductive material, and examples of the conductive material include metals such as ferrite-containing stainless steel and austenire-containing stainless steel, and ceramics such as perovskite and SiC. However, from the viewpoints of heat resistance and thermal shock resistance, the ferrite-containing stainless steel comprising Fe-Cr-Al is most preferable. Alternatively, partition walls themselves of the honeycomb structure do not have to be made of a conductive material, and for example, an insulating material such as cordierire may be coated with a conductive material such as Pt or cermet by plating or a sputtering process, whereby the coating film of the conductive material can generate heat by electrification.

The honeycomb structure may be prepared by winding up a metal foil or by an extrusion technique in accordance with a powder metallurgy method, but in view of the durability of the structure, particularly in order to get rid of telescoping under severe conditions, it is preferable to use the extrusion technique.

No particular restriction is put on the sectional shape (the cell shape) of passages which extend through the honeycomb structure, and any polygonal shape such as rectangle and hexagon, circle and corrugation can be used. However, in view of thermal shock resistance, the flexible cell shape which can relieve thermal stress, for example, the hexagonal shape is preferable.

Next, among the honeycomb structures which can be used in the present invention, an embodiment of a process for preparing the metallic honeycomb structure will be described.

In the first place, a metal powder material having a desired composition is prepared from, for example, an Fe powder, an Al powder, a Cr powder or a powder of an alloy thereof. Next, the thus prepared metal powder material is mixed with an organic binder such as methyl cellulose or polyvinyl alcohol and water, and the resulting mixture is then extruded into a desired honeycomb shape.

In the mixing step of mixing the metal powder material with the organic binder and water, it is preferable to mix the metal powder with an antioxidant such as oleic acid prior to the addition of water. Alternatively, it is also preferable to use the metal powder beforehand subjected to an antioxidizing treatment.

Next, the extruded honeycomb is fired at a temperature of 1,000° to 1,400° C. under a non-oxidizing atmosphere. In this case, the firing is preferably carried out under the non-oxidizing atmosphere containing hydrogen, because Fe or the like can be utilized as a catalyst to decompose and remove the organic binder, thereby obtaining a good sintered body.

If the firing temperature is less than 1,000° C., the molded article is not sintered, and if it is more than 1,400° C., the deformed sintered body is inconveniently obtained.

Next, the surfaces of the partition walls and pores of the obtained sintered body are coated with a heat-resistant metal oxide, if desired. Preferable methods for coating the same with the heat-resistant metal oxide are as follows.

(1) The metal honeycomb structure is thermally treated at 700° to 1,100° C. in an oxidizing atmosphere.

(2) The surfaces of the partition walls and pores of the sintered body are plated with aluminum or the like (e.g., a gaseous plating), followed by a heat treatment at 700° to 1,100° C. in the oxidizing atmosphere.

(3) The sintered body is immersed in a metal hot melt of aluminum or the like, followed by a heat treatment at 700° to 1,100° C. in the oxidizing atmosphere.

(4) The surfaces of the partition walls and pores of the sintered body are coated with an alumina sol, followed by a heat treatment at 700° to 1,100° C. in the oxidizing atmosphere.

The temperature of the heat treatment is preferably in the range of 900° to 1,100° C. from the viewpoints of heat resistance and oxidation resistance.

The honeycomb structure is provided with at least two electrodes for electrification. Here, the electrodes include an electrode on an earth side. The electrodes are connected to a power source such as a battery or a capacitor via a switch and a control device so that they may be electrified, and they can be attached to an outer or an inner periphery of the honeycomb structure.

It is preferable that a catalyst layer containing a catalyst-activating substance is supported on the partition walls of the honeycomb structure so as to cover them.

The catalyst layer supported on the partition walls of the honeycomb structure comprises a carrier having a large surface area and the catalyst-activating substance supported on the carrier. Typical examples of the carrier having a large surface area include $\gamma$-$Al_2O_3$, $TiO_2$, $SiO_2$-$Al_2O_3$ and perovskite. Typical examples of the catalyst-activating substance include noble metals such as Pt, Pd and Rh, and base metals such as Cu, Ni, Cr and Co. Among others, a preferable example is one which one or more noble metals of Pt, Pd and Rh are supported on $\gamma$-$Al_2O_3$.

The thus constituted honeycomb heater of the present invention has end surfaces on gas inlet and gas outlet sides, and an exhaust gas flows from the gas inlet side end surface to the gas outlet side end surface via the passages. The honeycomb heater is usually held preferably in an insulating state in a metallic can, and it is arranged so that the exhaust gas may be introduced into the honeycomb heater in the can through its gas inlet side end surface.

The honeycomb heater is heated by the electrification, but at this time, it is necessary that slits are formed so that a specific region of the honeycomb heater, preferably a specific region including at least a gas inlet side end surface neighborhood may be locally heated more quickly as compared with the other region of the heater.

The reason why the quick heating region is preferably constituted so as to include at least the gas inlet side end surface neighborhood is that, as described above, the heat of reaction generated by locally quickly heating the upstream portion of the honeycomb heater can transfer to the lower portion of the honeycomb heater in turn to heat the catalyst layer on the downstream side of the honeycomb heater or the light-off catalyst or the like arranged in the downstream portion of the honeycomb heater. Conversely, if a gas outlet side end surface neighborhood alone is heated by the electrification, the gas inlet side end surface neighborhood is not heated, and so the same functions as a heat sink. In consequence, the power to be applied and a purification efficiency are unsatisfactory.

It is also one of suitable embodiments to uniformly (locally as seen from the section of a gas passage) and quickly heat the honeycomb heater from the gas inlet side end surface to the gas outlet side end surface in a gas flow direction. In this case, a large amount of the heat of reaction generated by the catalyst on the heater is useful to quickly activate the light-off catalyst or the main catalyst which is usually arranged immediately in the rear of the heater.

In the present invention, the phrase "locally quickly heated" means that one or more quick heating portions and one or more slow heating portions (inclusive of non-heating portions) are present in the heater, and the honeycomb heater is heated so that the slow heating portions may be lower than a catalyst ignition temperature by 50° C. or more, preferably 100° C. or more, when the quick heating portions have reached the catalyst ignition temperature. If the temperature difference is less than 50° C., the heater is wholly heated, so that the intended effect of the power reduction is poor. If it is more than 100° C., the suitable purification performance can be exerted by the application of the relatively low electric power.

Moreover, the phrase "catalyst ignition temperature" means a temperature at which the reaction intermittently occurs without the extinction of the catalyst, and the aim of the catalyst ignition temperature is 350° C. or more. The catalyst deteriorates when used for a long period of time, and in the case of the local heating type heater, there is a problem of heat drawn by the slow heating portions. Therefore, a temperature of 500° C. or more can be surely considered to be the catalyst ignition temperature.

Next, some embodiments of the present invention will be described with reference to drawings.

In a first embodiment of the present invention, as shown in FIGS. 1(a) and 1(b), the outer periphery of a honeycomb structure 1 is divided into a first semicircular outer periphery a–a' and a second semicircular outer periphery b–b' by two electrodes 5 so that these peripheries to face to each other, and at least two first slits 10 and at least two second slits 11 are alternately arranged except slits in the vicinity of the electrodes. Here, the first slits 10 cut the first semicircular outer periphery a–a' but do not cut the second semicircular outer periphery b–b', and the second slits 11 cut the second semicircular outer periphery b–b' but do not cut the first semicircular outer periphery a–a'. The number of each of the alternately arranged first slits 10 and second slits 11 is 2 or more, and for example, the number may be 3. However, even if the number of the slits is meaninglessly increased, the effect of the present invention does not substantially change.

In this constitution, the regions between the first slits 10 and the second slits 11 allow current to flow therethrough, on the other hand, the regions put between the first slits 10 or between the second slits 11 scarcely allow current to flow therethrough. In consequence, belt-like quick heating portions are formed in the regions between the first slits 10 and the second slits 11, as shown by regions enclosed by dotted lines in the plan view of FIG. 1(a) and the front view of FIG. 1(b).

Figure 16:
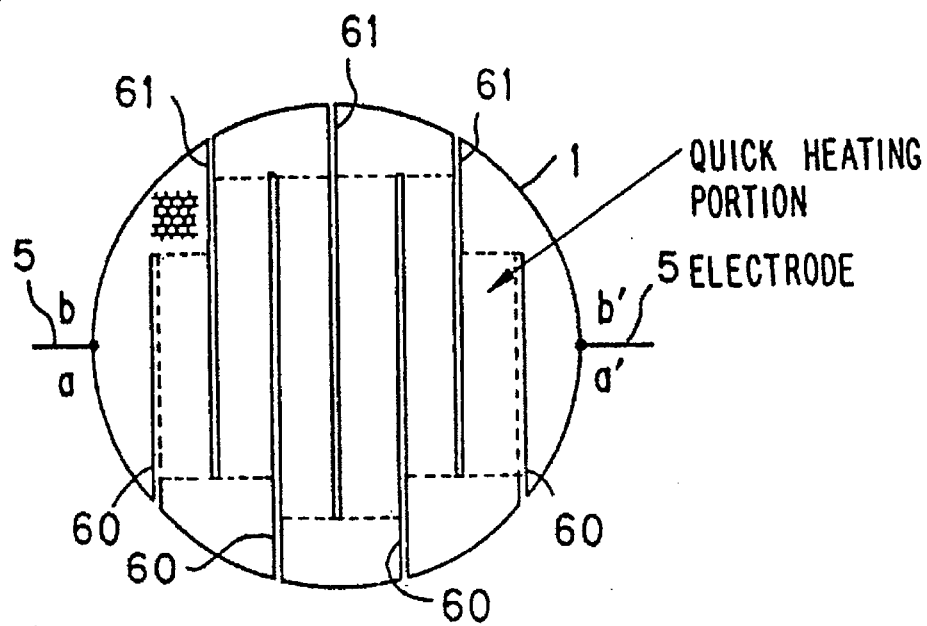
FIGS. 16(a) and 16(b) are illustrative views of a conventional known resistance adjustable type heater having slits.
Figure 16:
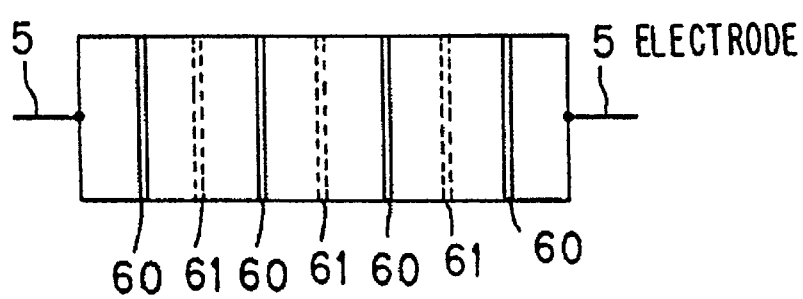

FIGS. 16(a) and 16(b) show a conventional known resistance adjustable type heater having slits which is described as an example in Japanese Patent Application Laid-open No. 295184/1991 already filed by the present applicant. In this known heater, the outer periphery of a honeycomb structure 1 is divided into a first semicircular outer periphery a–a' and a second semicircular outer periphery b–b' by two electrodes 5 so that these peripheries face each other, and first slits 60 and second slits 61 are alternately arranged at substantially equal intervals. Here, the first slits 60 cut the first semicircular outer periphery a–a' but do not cut the second semicircular outer periphery b–b', and the second slits 61 cut the second semicircular outer periphery b–b' but do not cut the first semicircular outer periphery a–a'.

In such a constitution, current flows through a region between the pair of slits, so that the whole heater is uniformly heated as shown by dotted-line regions in a plan view of FIG. 16(a) and a front view of FIG. 16(b). Therefore, it is difficult to achieve quick heating with a low electric power.

Figure 2:
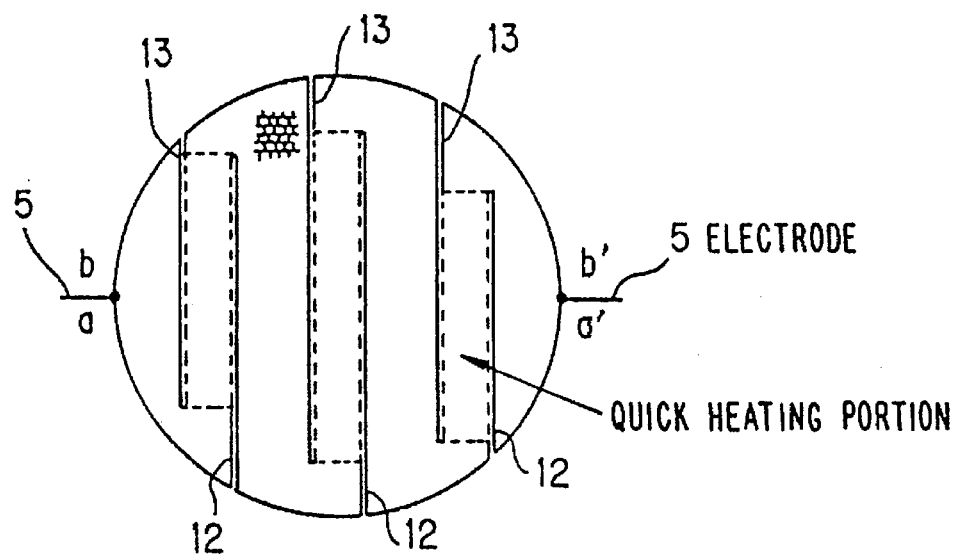
FIGS. 2(a) and 2(b) are illustrative views showing one embodiment of the present invention.
Figure 2:
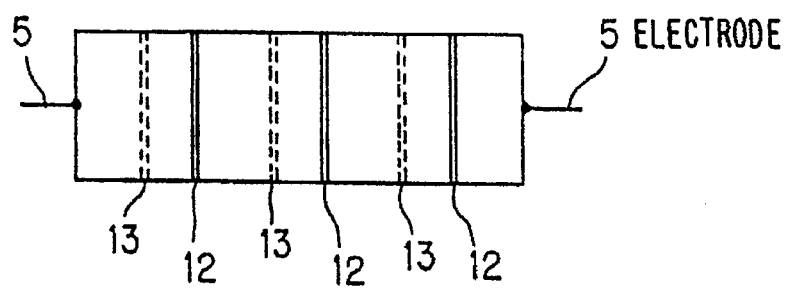

In a second embodiment of the present invention, as shown in FIGS. 2(a) and 2(b), the outer periphery of a honeycomb structure 1 is divided into a first semicircular outer periphery a–a' and a second semicircular outer periphery b–b' by two electrodes 5 so that these peripheries to face to each other, and first slits 12 and second slits 13 are alternately arranged so that spaces between the first slits 12 and the second slits 13 may be nonuniform. Here, the first slits 12 cut the first semicircular outer periphery a–a' but do not cut the second semicircular outer periphery b–b', and the second slits 13 cut the second semicircular outer periphery b–b' but do not cut the first semicircular outer periphery a–a'.

That is to say, this embodiment is the same as a conventional known heater shown in FIGS. 16(a) and 16(b) in that the first slits 12 and the second slits 13 are alternately arranged, but the spaces between the first slits 12 and the second slits 13 may be nonuniform and thus two or more kinds of slit spaces having different widths may be formed. Consequently, in the regions having the relatively narrow spaces, the sectional area of a current flow path is smaller (a current density is higher) than in the regions having the wide spaces, and so the regions having the relatively narrow spaces are predominantly heated. Therefore, as shown by dotted-line regions in a plan view of FIG. 2(a) and a front view of FIG. 2(b), belt-like quick heating portions are formed in the regions having the relatively narrow spaces between the slits. In the embodiment shown in FIGS. 2(a) and 2(b), the regions having the narrow spaces and the regions having the wide spaces are alternately arranged, but instead of such an alternate arrangement, these regions can also be optionally combined to quickly heat the specific regions. Moreover, it is also possible to optionally change each space between the first slit 12 and the second slit 13.

Figure 3:
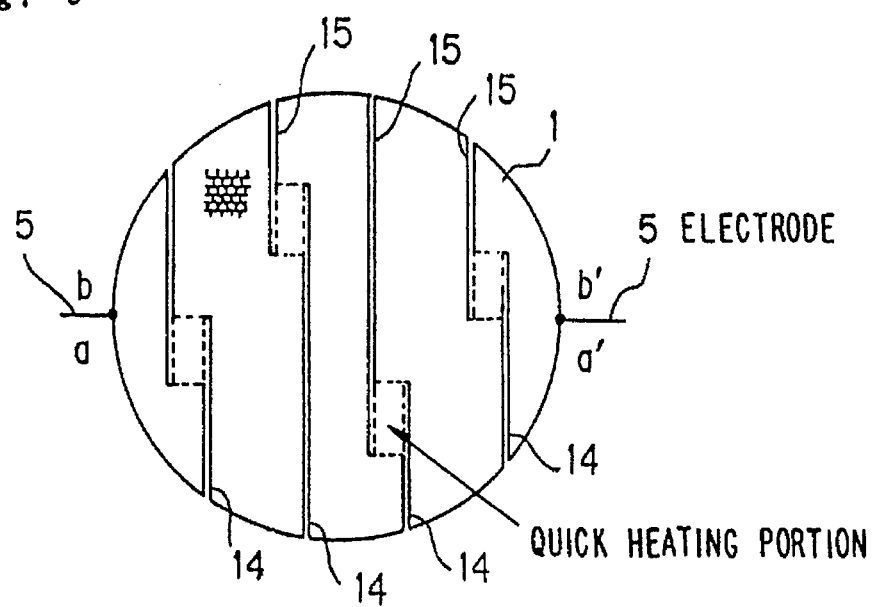
FIG. 3 is an illustrative view showing one embodiment of the present invention.

In a third embodiment of the present invention, as shown in FIG. 3, the outer periphery of a honeycomb structure 1 is divided into a first semicircular outer periphery a–a' and a second semicircular outer periphery b–b' by two electrodes 5 so that these peripheries face each other, and first slits 14 and second slits 15 are alternately arranged so that spaces between the first slits 14 and the second slits 15 may be nonuniform, so that regions having relatively narrow spaces between the first slits and the second slits are scattered, and so that the sectional area of these regions may be relatively small. Here, the first slits 14 cut the first semicircular outer periphery a–a' but do not cut the second semicircular outer periphery b–b', and the second slits 15 cut the second semicircular outer periphery b–b' but do not cut the first semicircular outer periphery a–a'.

That is to say, this third embodiment is the same as the second embodiment in that the spaces between the first slits 14 and the second slits 15 are not uniform to form two or more kinds of slit spaces having different widths, but in the third embodiment, the length of the first slits 14 and the second slits 15 is adjusted to form the relatively narrow spaces, and the regions between these slits are scattered so that the sectional area of these regions is relatively small. Therefore, in contrast to the second embodiment in which the belt-like quick heating portions are formed, the third embodiment provides the scattered quick heating portions, as shown by dotted-line regions in a plan view of FIG. 3. In this embodiment, the spaces between the first slits 14 and the second slits 15 can be optionally changed to arrange the quick heating portions at different scattered positions, as in the above-mentioned second embodiment.

Figure 4:
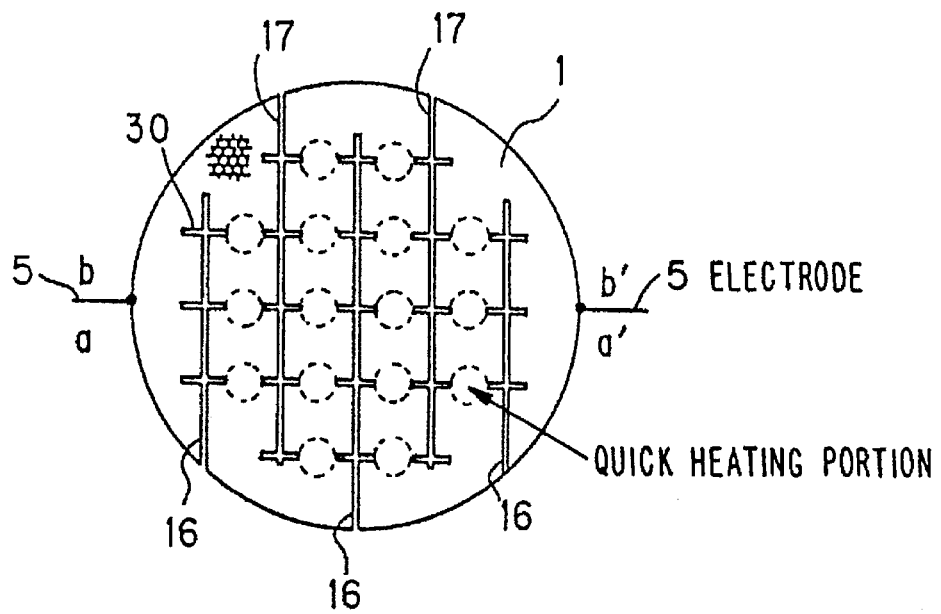
FIG. 4 is an illustrative view showing one embodiment of the present invention.

In a fourth embodiment of the present invention, as shown in FIG. 4, the outer periphery of a honeycomb structure 1 is divided into a first semicircular outer periphery a–a' and a second semicircular outer periphery b–b' by two electrodes 5 so that these peripheries face each other, and first slits 16 and second slits 17 are alternately arranged and third slits 30 are further arranged so as to cross the first slits 16 or the second slits 17. Here, the first slits 16 cut the first semicircular outer periphery a–a' but do not cut the second semicircular outer periphery b–b', and the second slits 17 cut the second semicircular outer periphery b–b' but do not cut the first semicircular outer periphery a–a'.

That is to say, this fourth embodiment is the same as a conventional known heater shown in FIGS. 16(a) and 16(b) in that the first slits 16 and the second slits 17 are alternately arranged, but in the fourth embodiment, the third slits crossing these slits are arranged, so that there are formed narrow current flow path regions (high-resistance regions) for current which flows between the first slits 16 and the second slits 17 and these narrow regions are predominantly heated. Therefore, as shown by dotted-line regions in a plan view of FIG. 4, quick heating portions are scattered in the narrow current flow path regions. In this connection, the third slits are preferably arranged so as to cross the first slits or the second slits at right angles. Furthermore, the third slits may pass through the honeycomb structure in a gas flow direction.

In a fifth embodiment of the present invention, as shown in FIGS. 5(a), 5(b) and 5(c), the outer periphery of a honeycomb structure 1 is divided into a first semicircular outer periphery a–a' and a second semicircular outer periphery b–b' by two electrodes 5 so that these peripheries face each other, and first slits 18 and second slits 19 are alternately arranged and formed so that at least parts of these first and second slits 18, 19 may be short on the side of a gas inlet side end surface 6 and long on the side of a gas outlet side end surface 7. Here, the first slits 18 cut the first semicircular outer periphery a–a' but do not cut the second semicircular outer periphery b–b', and the second slits 19 cut the second semicircular outer periphery b–b' but do not cut the first semicircular outer periphery a–a'.

That is to say, this fifth embodiment is the same as a conventional known heater shown in FIGS. 16(a) and 16(b) in that the first slits 16 and the second slits 17 are alternately arranged, but as shown in a plane view of FIG. 5(a) and sectional views of FIGS. 5(b) and 5(c) cut along the lines A—A and B—B, respectively, the first slits 18 and the second slits 19 are arranged and they are formed so that slit planes 40 formed in the honeycomb structure 1 may be short on the side of the gas inlet side end surface 6 and long on the side of the gas outlet side end surface 7 in a gas flow direction. Therefore, as shown by dotted-line region in sectional views of FIGS. 5(b) and 5(c), regions having short current flow paths on the side of the gas inlet which are given by the formation of the first slits 18 and the second slits 19 are predominantly heated to become quick heating portions.

In a sixth embodiment of the present invention, as shown in FIGS. 6(a), 6(b) and 6(c), the outer periphery of a honeycomb structure 1 is divided into a first semicircular outer periphery a–a' and a second semicircular outer periphery b–b' by two electrodes 5 so that these peripheries face each other, and first slits 20 and second slits 21 are alternately arranged and formed so that at least parts of these first and second slits 20 and 21 may be shortest at positions which are slightly internal from a gas inlet side end surface 6. Here, the first slits 20 cut the first semicircular outer periphery a–a' but do not cut the second semicircular outer periphery b–b', and the second slits 21 cut the second semicircular outer periphery b–b' but do not cut the first semicircular outer periphery a–a'.

That is to say, this sixth embodiment is fundamentally similar to the above-mentioned fifth embodiment, but as shown in a plan view of FIG. 6(a) and sectional views of FIGS. 6(b) and 6(c) cut along the lines A—A and B—B, respectively, the first slits 20 and the second slits 21 are arranged and they are formed so that slit planes 40 formed in the honeycomb structure 1 may be shortest at positions which are slightly internal from the gas inlet side end surface 6 in a gas flow direction. Therefore, as shown by dotted-line regions in sectional views of FIGS. 6(b) and 6(c), regions having the shortest current flow paths which are slightly internal from the gas inlet side end surface 6 and which are given by the formation of the first slits 20 and the second slits 21 are predominantly heated to become quick heating portions.

Figure 7:
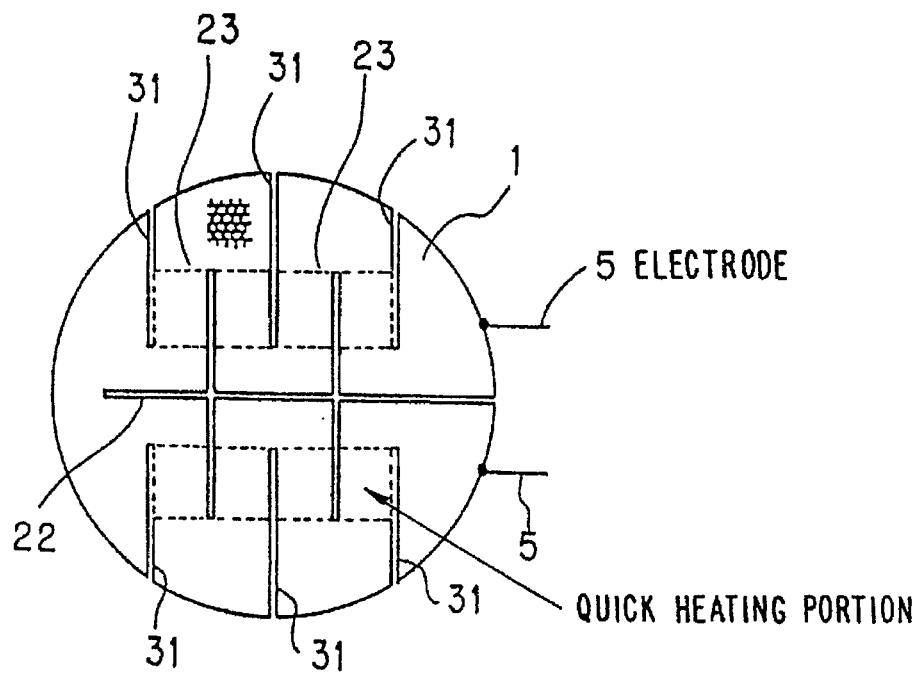
FIG. 7 is an illustrative view showing one embodiment of the present invention.

In a seventh embodiment of the present invention, as shown in FIG. 7, a first slit 22 is formed which extends from between two electrodes 5 on the outer periphery of a honeycomb structure 1 so as to pass through about its center and not to cut the facing outer periphery, and second slits 22 are formed which cross the first slit 22 and which extend to the outer periphery so as not to cut the out periphery. In addition, third slits 23 are formed which extend from the outer periphery toward the first slit 22 so as not to contact with the first slit 22 and the second slits 23.

In this embodiment, as shown by dotted-line regions in a plan view of FIG. 7, narrow current flow path regions between the second slits 23 and the third slits 31 are predominantly heated to become quick heating portions.

Figure 8:
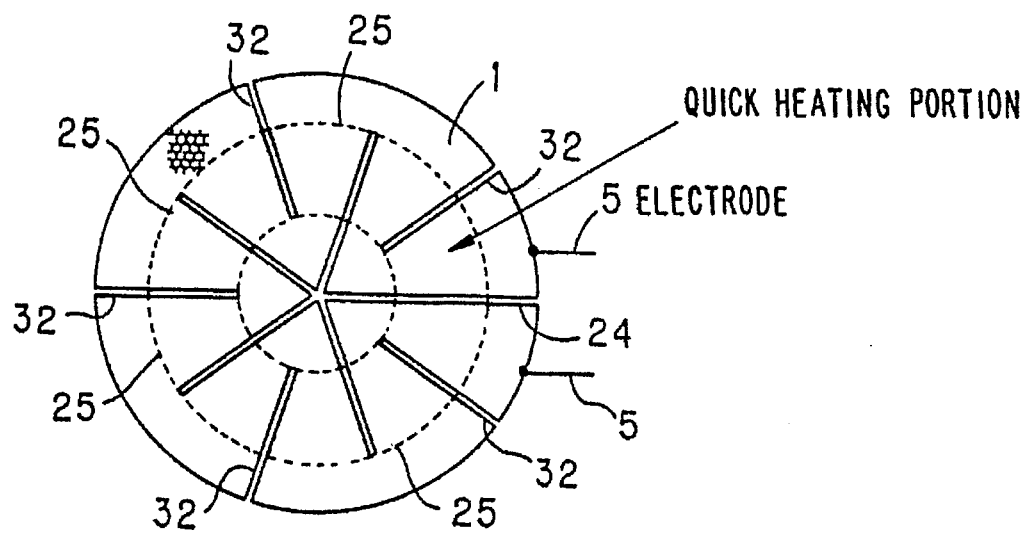
FIG. 8 is an illustrative view showing one embodiment of the present invention.

In an eighth embodiment of the present invention, as shown in FIG. 8, a first slit 24 is formed which extends from between two electrodes 5 on the outer periphery of a honeycomb structure 1 to the center of the honeycomb structure 1, and second slits 25 are formed which radially extend from the tip of the first slit 24 to the outer periphery so as not to cut the outer periphery. In addition, third slits 32 are formed which extend from the outer periphery of the honeycomb structure 1 toward the center so as not to contact with the first slit 24 and the second slits 25.

In this embodiment, as shown by dotted-line regions in a plan view of FIG. 8, narrow current flow path regions put between the second slits 25 or the first slit 24 and the third slits 32 are predominantly heated to become quick heating portions.

The various slits in the embodiments 1 to 8 described above can be used in an optional combination.

Figure 9:
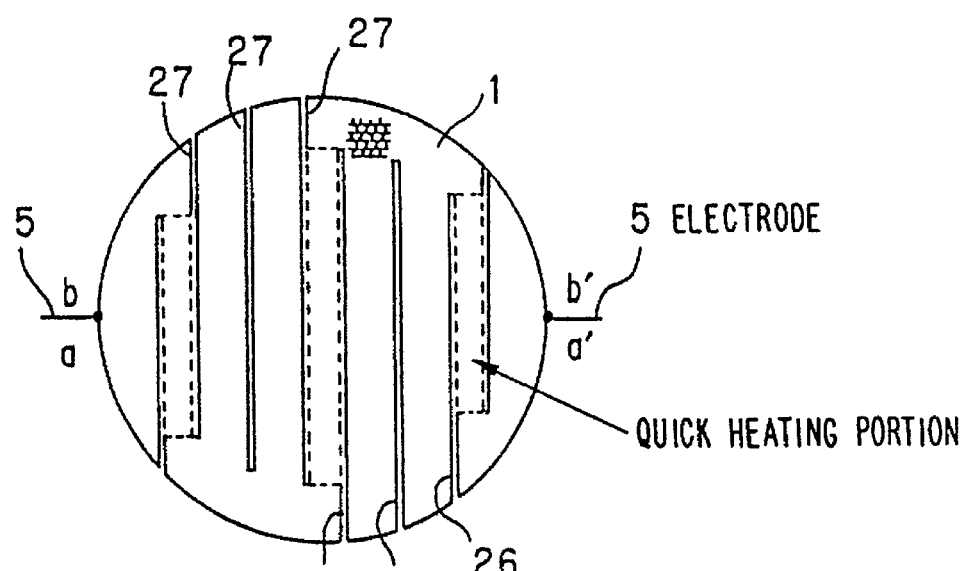
FIG. 9(a) and 9(b) are illustrative views showing one embodiment of the present invention.
Figure 9:
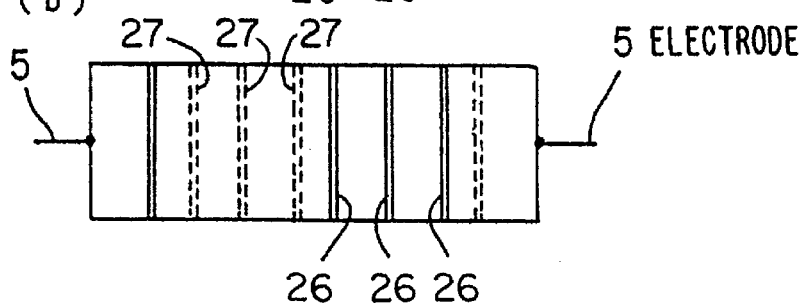

For example, FIGS. 9(a) and 9(b) show the combination of the conception of the first embodiment and the conception of the second embodiment, and the outer periphery of a honeycomb structure 1 is divided into a first semicircular outer periphery a–a' and a second semicircular outer periphery b–b' by two electrodes 5 so that these peripheries face each other, and three first slits 26 and three second slits 27 are alternately arranged except slits in the vicinity of the electrodes so that spaces between the first slits 26 and the second slits 27 may be narrower than spaces between the first slits 26 or between the second slits 27. Here, the first slits 26 cut the first semicircular outer periphery a–a' but do not cut the second semicircular outer periphery b–b', and the second slits 27 cut the second semicircular outer periphery b–b' but do not cut the first semicircular outer periphery a–a'.

The above-mentioned embodiments are merely exemplary, and the present invention can take various constitutions other than the above-mentioned embodiments, so long as specific regions of the honeycomb heater are constituted so as to be locally heated more quickly as compared with the other region, and the embodiments of the present invention can be combined with conventional known various resistance adjusting means.

Figure 10:
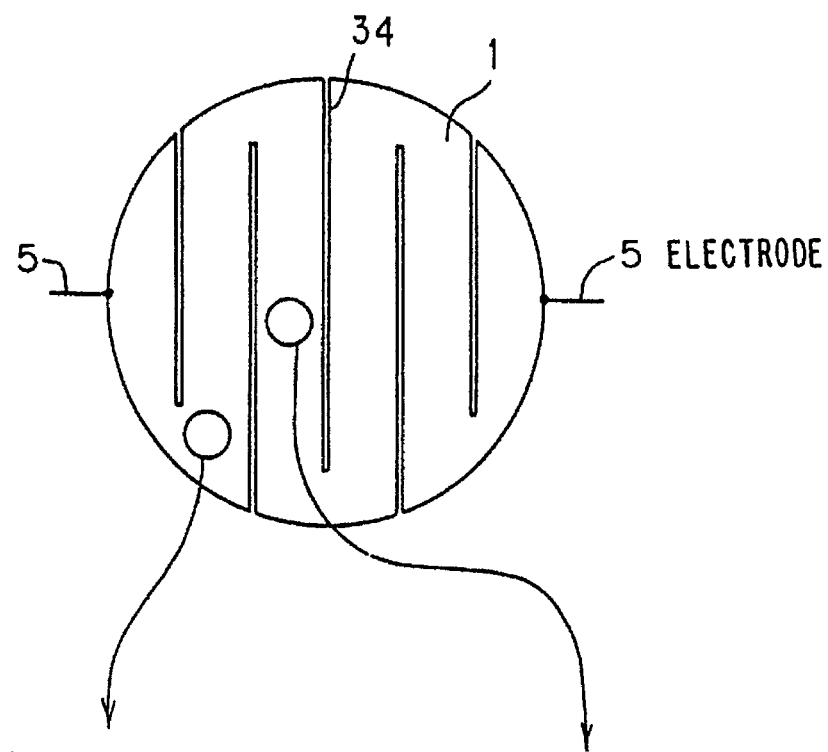
FIGS. 10(a), 10(b) and 10(c) are illustrative views showing a conventional known resistance adjustment means which can be used together with the present invention.
Figure 10:
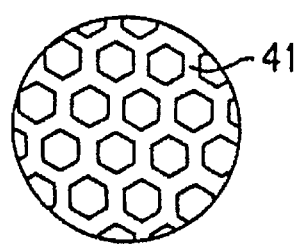
Figure 10:
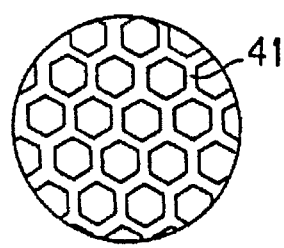
Figure 11:
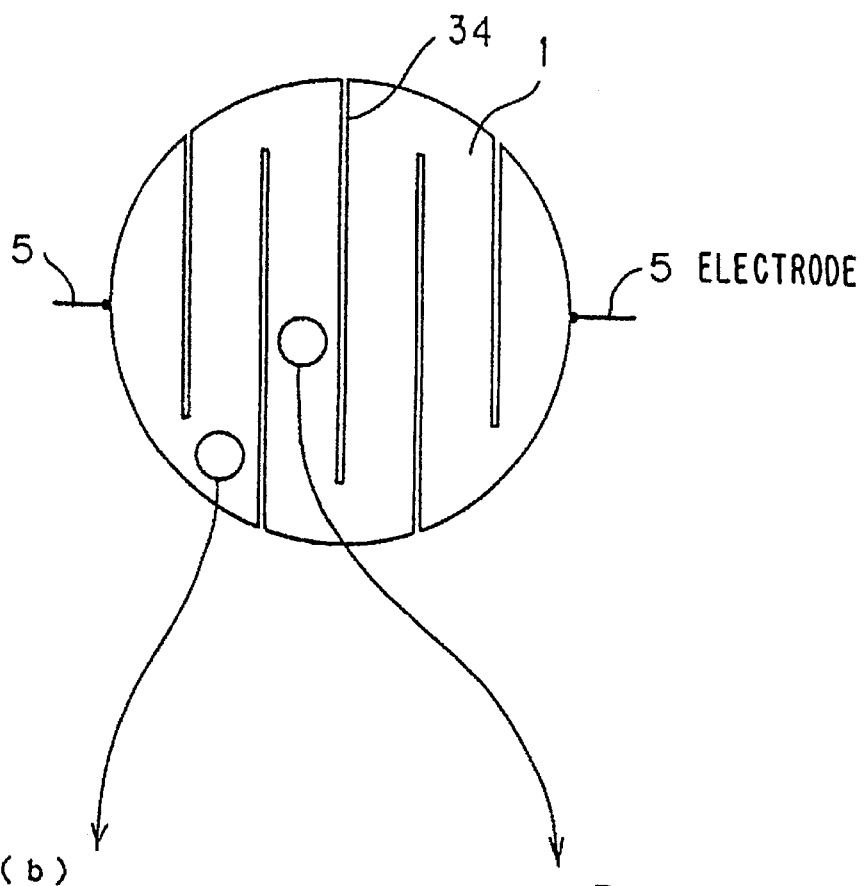
FIGS. 11(a), 11(b), 11(c) and 11(d) are illustrative views showing a conventional known resistance adjustment means which can be used together with the present invention.
Figure 11:
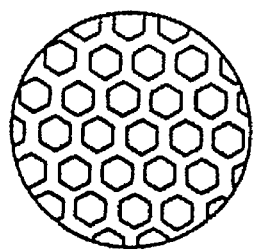
Figure 11:
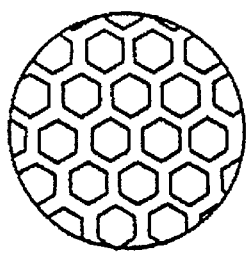
Figure 11:
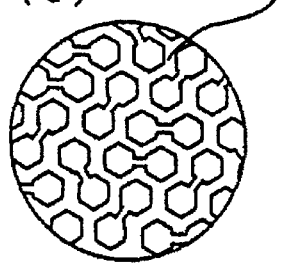

For example, as shown in a plan view of FIG. 10(a) and its partially enlarged views of FIGS. 10(b) and 10(c), there is a resistance adjusting means in which the thickness of the partition walls of a honeycomb structure 1 is partially changed to form regions having the thin partition walls in which a current density is high and which can be easily heated. In addition, as shown in a plan view of FIG. 11(a) and its partially enlarged views of FIGS. 11(b), 11(c) and 11(d), there is a resistance adjusting means in which the cell density of the honeycomb structure 1 is partially altered, or another resistance adjusting means in which regions are formed by eliminating parts of the partition walls 41, whereby the regions having a high current density and a low cell density or the regions in which the partition walls are eliminated can be easily heated. In addition to these means, in the case that slits 34 are formed, the above-mentioned first to eighth embodiments can be utilized, and other various slits, can also be used.

Figure 12:
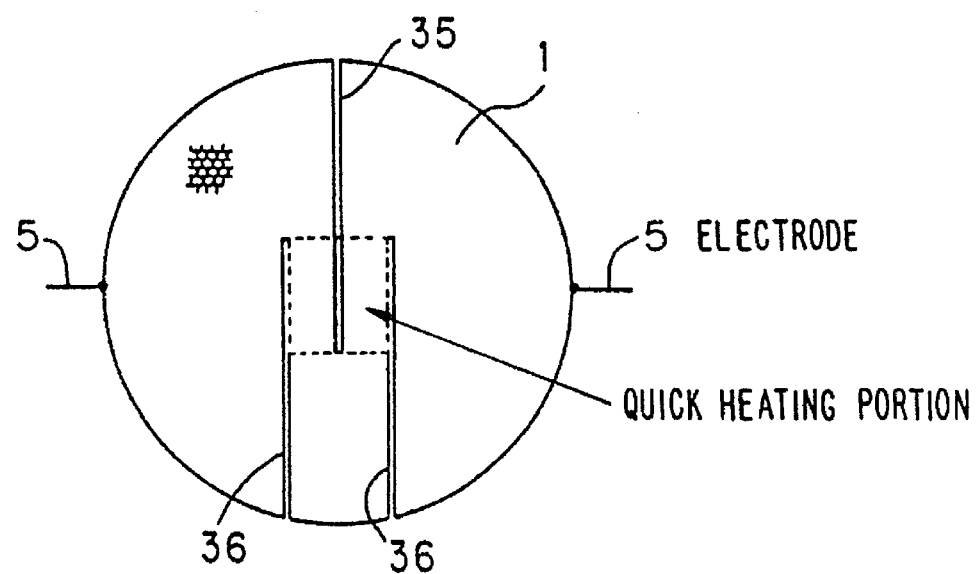
FIGS. 12(a) and 12(b) are illustrative views showing a conventional known resistance adjustment means which can be used together with the present invention.
Figure 12:
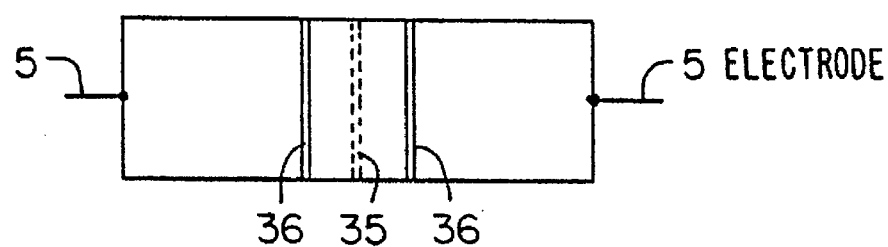

FIGS. 12(a) and 12(b) show one embodiment of a resistance adjustable type heater disclosed in Japanese Patent Application Laid-open No. 295184/1991 of the present applicant, and in this embodiment, a slit 35 and slits 36 are formed to alternately extend from the facing semicircular outer peripheries of a honeycomb structure 1 to about its center, whereby central regions between the slit 35 and the slits 36 and shown by dotted-line regions can be predominantly heated. When the conception of this embodiment is used together with the various slits in the embodiments of FIGS. 1 to 8, further certain regions in the central portion can be locally quickly heated.

In addition, Japanese Patent Application No. 299464/1993 already filed by the present applicant discloses a honeycomb heater in which, as shown in FIGS. 13(a), 13(b), 14(a), 14(b), 14(c), 15(a) and 15(c), slits 37 are formed so as to alternately extend from the facing semicircular outer peripheries of a honeycomb structure 1. Quick heating portions may be formed by hollowing out an orifice 51 (FIGS. 13(a) and 13(b)), spaces 52 (FIGS. 14(a), 14(b) and 14(c)) and spaces 53 (FIGS. 15(a), 15(b) and 15(c)) to extend from a gas flow outlet end surface 7 toward a gas flow inlet end surface 6 but not to pass through the gas flow inlet end surface 6. The dotted-line regions extending from the orifice 51, the spaces 52 and the spaces 53 are these quick heating portions. In this embodiment, the slits 37 are replaced with the various slits in the first to eighth embodiments, whereby the specific regions can be locally quickly heated.

In the present invention, the area of the quick heating portion is preferably in the range of 5 to 50% of the sectional area of the gas passage. If the area of the quick heating portion is less than 5% of the sectional area of the gas passage, a large amount of the gas passes through the slow heating portion without being purified, and heat of reaction by the catalyst in the quick heating portion is not so expected, so that a purification efficiency lowers. On the other hand, if it is more than 50%, the weight of the quick heating portion increases, and so it is necessary to increase the electric power to be applied, with the result that the effect of reducing the electric power decreases. The preferable ratio of the area of the quick heating portion to the sectional area of the gas passage is in the range of 10 to 40%, whereby there can be reduced 30% or more of the electric power required to heat a whole heating type heater in which most of the section of the gas passage is uniformly heated, and even by such a reduced electric power, a similar purification efficiency can be obtained.

In this case, the area of the quick heating portions can easily be calculated, for example, in the following way. That is to say, in the first place, the heating properties of the quick heating portions are evaluated in still air by the use of a thermovision. Next, in order to evaluate this honeycomb heater by an actual driving test, many thermocouples are attached to the honeycomb heater, and temperatures at many positions in the quick heating portions are measured, electrifying and heating the quick heating portions in accordance with an FTP (federal test procedure) test. Thus, the area of the quick heating portions can be determined from a temperature distribution on the thermovision and the actual heating properties of the heater.

The honeycomb heater of the present invention aims at a low-power type, and so the preparation of the relatively small heater is preferable. Concretely, the volume of the gas passage portion is set to about 30 to 300 cc. If the volume of the gas passage portion is less than 30 cc, the mechanical strength of the heater is poor and the effective area of the catalyst on the heater is limited, so that the heat of reaction obtained therefrom is insufficient and hence the desired purifying performance cannot be obtained. Conversely, if it is more than 300 cc, the honeycomb heater becomes a local heating type, but the weight of the heater increases, so that the application of an increased electric power is required. The preferable volume of the heater is in the range of 40 to 150 cc, and the effective purification can be achieved with a low electric power of less than 3 kW, depending upon a position where the heater is arranged.

"The low electric power" referred to herein means that wattage x time is as low as possible, but the long-time electrification at a low wattage is more preferable than the short-time electrification at a high wattage. That is to say, for the electrification at the high wattage, a high voltage and/or a large current is necessary. In the case of the high voltage, a complicated power source system and control system are required, and in the case of the large current, extremely thick cables and the like are required. Thus, in the case of a gasoline carl the battery power source and the current are preferably adjusted to be 12 V and 200 A or less, respectively. In this case, a power of 2 kW or less is to be applied to the heater, in view of internal resistances of the battery and the control system. As the power source, an alternater and an ultracapacitor can be preferably used in addition to the battery.

The length of the honeycomb heater is usually in the range of 6 to 40 mm, depending upon the sectional area of the honeycomb heater. If the length of the honeycomb heater is less than 6 mm, deformation occurs owing to creep at the time of a high temperature, and if it is more than 40 mm, the honeycomb heater deforms owing to thermal stress generated in the heater.

The length of the quick heating portion in a gas flow direction is 25 mm or less from the exhaust gas inlet end surface, and it is equal to or less than the length of the heater. If the length of the quick heating portion is more than 25 mm, the heat capacity of the quick heating portion increases, so that the problem of the electric power to be applied takes place inconveniently.

The thickness of the partition walls of the honeycomb heater is preferably in the range of about 40 to 300 μm, and the cell density is preferably in the range of 150 to 600 cells/inch$^2$.

In order to efficiently purify harmful substances in the exhaust gas, particularly HC generated in large quantities at the time of the cold start by the use of the honeycomb heater of the present invention described above, the electrification is preferably carried out so that the quick heating portion may reach a catalyst ignition temperature within 20 seconds from the cold start.

The electrification of the heater is carried out in an optional manner, for example, by a preheating means for starting the electrification before engine crank, a postheating means for starting the electrification immediately after the engine crank, or a combination of the preheating means and the postheating means, and this electrification can be done continuously or intermittently. In view of the simplicity of the control system, the postheating means is preferable, and it is also preferable to continuously apply the power once at the time of the cold start.

It is preferred that the temperature of the quick heating portion reaches 500° C. or more as early as possible, and in the Bag 1 of an FTP test, it is one aim that the temperature is reached within 20 seconds (at the time of idling). At this time, the upper limit of the temperature of the quick heating portion is about 1,000° C., and so the temperature of the quick heating portion is preferably 1,000° C. or less. If the temperature of the quick heating portion is in excess of 1,000° C., there is a fear that the honeycomb heater is deformed or broken owing to thermal stress generated by a temperature difference between the quick heating portion and the slow heating portion.

In the case that the exhaust gas purification system is constituted of such a honeycomb heater as in the present invention, the so-called light-off catalyst or main catalyst is usually arranged on the downstream side of the honeycomb heater. Since the honeycomb heater is operated with low power, its size is relatively small, and so the honeycomb heater itself is insufficient to purify all the HC exhausted at the cold start. Therefore, the relatively small (about 0.2 to 1.2 l) light-off catalyst is arranged on the downstream side of the honeycomb heater. In addition, for the purpose of improving the purification performance at a steady drive (e.g., Bag 2), the so-called main catalyst having a relatively large volume (about 1 to 3 l) is arranged on the downstream side of the light-off catalyst.

As another constitution, for example, the relatively small (about 0.2 to 1.2 l) light-off catalyst may be arranged on the most upstream side of the exhaust gas flow passage, and the honeycomb heater may follow, and the light-off catalyst and the main catalyst may be further arranged on the downstream side of the honeycomb heater. In this case, the application of a little more power to the honeycomb heater is required as compared with the constitution in which the honeycomb heater is arranged on the most upstream side, but the most upstream light-off catalyst functions as a thermal shock absorber, so that it is not necessary to be concerned about the durability of the honeycomb heater.

The above-mentioned "light-off catalyst" and "main catalyst" are common names, and in short, they are catalysts having a catalytic function capable of purifying the exhaust gas discharged from an internal combustion engine. In general, as these catalysts, there can be used ceramic or metallic honeycomb structures on which a catalyst activating substance having the catalytic function is supported in the form of a catalyst layer.

The honeycomb heater is preferably arranged at the so-called manifold position in the vicinity of an engine exhaust port so as to utilize exhaust heat. In this case, the honeycomb heater is exposed to particularly severe exhaust gas conditions, and so it is preferable to use the honeycomb heater prepared by an extrusion method, as described above. When arranged at the manifold position, the honeycomb heater exerts the suitable purification performance with an electric power of 1 kW or less.

At the time of the cold start, a car is usually driven in a rich fuel state, but in such a state, the HC purification performance of the honeycomb heater is insufficient, even if the heater is quickly heated. Thus, the introduction of secondary air is effective, or it is also preferable that after engine crank, the amounts of the fuel and air are adjusted to shift the composition of the exhaust gas to a nearly stoichiometric amount or a slightly lean side.

As described above, according to the present invention, harmful substances in exhaust gas discharged from an internal combustion engine, particularly HC generated in large quantities at the time of a cold start can be effectively purified with a low electric power.

Next, the present invention will be described in more detail with reference to examples, but the scope of the present invention should not be limited to these examples.

EXAMPLE 1

A honeycomb heater of the above-mentioned first embodiment was prepared in accordance with the following preparation procedure. In this case, the number of each of first slits and second slits was 5 (inclusive of slits in the vicinity of electrodes), and the two first slits and the two second slits were arranged so as to alternate with each other. Furthermore, the number of the cells between the slit was 6, and the distance from the tip of each slit to the outer periphery (the distance on a line extended from the slit) was set to 7 mm.

Preparation Method of Honeycomb Heater

An Fe powder, a Cr-30 Al powder (wt %), an Fe-50 Al powder (wt %), an Fe-20 B powder (wt %) and a $Y_2O_3$ powder, all having an average particle diameter of 44 µm or less were mixed so as to obtain a composition of Fe-16 Cr-8 Al-0.05 B-0.5 $Y_2O_3$. Next, 4 g of methyl cellulose as an organic binder and 1 g of oleic acid as an antioxidant were added to and mixed with 100 g of the resulting mixture. After the preparation of such a clay, it was then extruded into a cylindrical honeycomb article.

This honeycomb article was dried at 90° C. for 16 hours in the atmosphere, and then held at 1,325° C. for 2 hours to sinter the article. Next, the article was subjected to a heat treatment at 1,150° C. for 30 minutes in air.

In accordance with the above-mentioned procedure, a honeycomb structure was obtained which had an outer diameter of 93 mm, a thickness of 12 mm, a partition wall thickness of 0.1 mm and a hexagonal cell density of 450 cells/inch$^2$. The porosity of this honeycomb structure was 2% (substantially non-porous), and a protective layer of an $Al_2O_3$ component was formed on the surface of the honeycomb structure.

Slits were formed in this honeycomb structure as described above to prepare quick heating portions.

After the formation of the slits, a mixture of $\gamma$-$Al_2O_3$ and $CeO_2$ was prepared so that a weight ratio of $\gamma$-$Al_2O_3$:$CeO_2$ might be 70:30, and water and a trace amount of nitric acid were then added to the mixture. Afterward, the mixture was ground by a wet method to prepare a carrier slurry, and a wash coat was then formed on the honeycomb structure in accordance with a dipping method by the use of this carrier slurry. Next, this wash coat was dried, and then fired at a temperature of 500° C. to cover the honeycomb structure with $\gamma$-$Al_2O_3$ and $CeO_2$. The thus treated honeycomb structure was immersed in an aqueous solution comprising palladium nitrate, chloroplatinic acid and rhodium nitrate for about 20 minutes so that a molar ratio of Pd:Pt:Rh might be 6:5:1 and so that the total amount of the supported components might be 80 g/ft$^3$, whereby a catalyst composition was supported on the honeycomb structure.

Next, electrode bolts were welded at two positions on the outer periphery of the honeycomb structure to prepare a honeycomb heater. This honeycomb heater was held in a metallic can by fixing the outer periphery of the honeycomb heater via an insulating material.

EXAMPLE 2

A honeycomb heater of the above-mentioned second embodiment was prepared in accordance with the same preparation procedure as in Example 1. In this example, the number of each of first slits and second slits was 5, and they were arranged so as to alternate narrow spaces and wide spaces with each other. In this case, the number of cells between the slits defining the narrow spaces was 4, and the number of cells between the slits defining the wide spaces was 8. The distance from the tip of each slit to the outer periphery (the distance on a line extended from the slit) was set to 7 mm.

EXAMPLE 3

A honeycomb heater of the above-mentioned third embodiment was prepared in accordance with the same preparation procedure as in Example 1. In this example, 5 quick heating portions were formed by adjusting the length of first slits and second slits so that were scattered. In this case, the number of cells between the slits defining the narrow spaces which became the quick heating portions was 3, and the number of cells between the slits defining the wide spaces was 9. The regions between the slits for defining the narrow spaces which became the quick heating portions had 3 mm width×15 mm length.

EXAMPLE 4

A honeycomb heater of the above-mentioned fourth embodiment was prepared in accordance with the same preparation procedure as in Example 1. In this example, the number of each of first slits and second slits was 5, and the number of cells between each pair of slits was 6. The distance from the tip of each slit to a facing outer periphery (the distance on a line extended from the slit) was set to 7 mm. Furthermore, third slits were arranged at an interval of 15 mm so as to cross the first slits or the second slits at right angles, and the third slit had a length corresponding to 2 cells on right and left sides from the first slit or the second slit.

EXAMPLE 5

A honeycomb heater of the above-mentioned fifth embodiment was prepared in accordance with the same preparation procedure as in Example 1. In this example, the distance from the tips of first slits and second slits to a facing outer periphery (the distance on a line extended from the slits) was 25 mm on a gas inlet side end surface and 7 mm on a gas outlet side end surface. The number of cells between each pair of slits was 6.

EXAMPLE 6

A honeycomb heater of the above-mentioned sixth embodiment was prepared in accordance with the same preparation procedure as in Example 1. In this example, the distance from the tips of first slits and second slits to a faced outer periphery (the distance on a line extended from the slits) was 20 mm on a gas inlet side end surface, 7 mm on a gas outlet side end surface, and 25 mm at a position which was 5 mm internal from the gas inlet side end surface. The number of cells between each pair of slits was 6.

EXAMPLE 7

A honeycomb heater of the above-mentioned seventh embodiment was prepared in accordance with the same preparation procedure as in Example 1. In this example, a first slit was formed so as to pass through the center of a honeycomb structure and so that the distance from its tip to a facing outer periphery (the distance on a line extended from the slit) might be 15 mm. Five second slits were formed so as to cross first slits at right angles and so that the distance from the tip of each second slit to the outer periphery (the distance on a line extended from the second slit) might be 15 mm. Eight third slits were formed so that the distance from the tip of each third slit to the first slit (the distance on a line extended from the third slit) might be 10 mm (4 slits from each of both the sides of the first slit).

EXAMPLE 8

A honeycomb heater of the above-mentioned eighth embodiment was prepared in accordance with the same preparation procedure as in Example 1. In this example, a first slit was formed so that its tip might be positioned at the center of a honeycomb structure. Three second slits were formed so as to extend from the tip of the first slit toward an outer periphery and so that the distance from the tip of each second slit to the outer periphery (the distance on a line extended from the second slit) might be 15 mm and so that an angle between the second slit and the first slit and an angle between each pair of second slits might be 90°. Moreover, four third slits were formed so as to extend from the outer periphery of the honeycomb structure toward its central point (the tip of the first slit) and so that the distance from the tip of each third slit to the central point might be 15 mm and so that an angle between a line extended from the third slit and the second slit or the first slit might be 45°.

EXAMPLE 9

A honeycomb structure was extruded by adjusting a extrusion die so that the central portion and the outer periphery of the honeycomb structure had thin partition walls and thick partition walls, respectively, and the thus extruded honeycomb structure was dried, sintered, and then thermally treated by the same procedure as in Example 1. The thus obtained honeycomb structure had a partition wall thickness of 0.1 mm in a region having a diameter of 50 mm in the central portion and a partition wall thickness of 0.14 mm in its outer peripheral region (outer diameter=93 mm, thickness=12 mm, cell shape=hexagon, and cell density= 450 cells/inch$^2$). Afterward, 5 slits were formed from each of the faced semicircular outer peripheries of the honeycomb structure so that the slits might be alternately arranged and so that the distance from the tip of each slit to the outer periphery (the distance on a line extended from the slit) might be 7 mm. For this honeycomb structure, the supporting of a catalyst composition, the welding of bolts and the holding in a can were carried out in the same manner as in Example 1, to prepare a honeycomb heater.

EXAMPLE 10

A honeycomb structure was extruded by adjusting a extrusion die so that the central portion and the outer periphery of the honeycomb structure might have a low cell density and a high cell density, respectively, and the thus extruded honeycomb structure was dried, sintered, and then thermally treated by the same procedure as in Example 1. The thus obtained honeycomb structure had a cell density of 350 cells/inch$^2$ in a region having a diameter of 50 mm in the central portion and a cell density of 450 cells/inch$^2$ in its outer peripheral region (outer diameter=93 mm, thickness= 12 mm, cell shape=hexagon, and partition wall thickness= 0.1 mm). In a boundary region between the central portion and the outer periphery, the cell density was continuously changed. Afterward, 5 slits were formed from each of the facing semicircular outer peripheries of the honeycomb structure so that the slits might be alternately arranged and so that the distance from the tip of each slit to the outer periphery (the distance on a line extended from the slit) might be 7 mm. For this honeycomb structure, the supporting of a catalyst composition, the welding of bolts and the holding in a can were carried out in the same manner as in Example 1, to prepare honeycomb heater.

COMPARATIVE EXAMPLE 1

In accordance with the same procedure as in Example 1, a conventional known resistance adjustable type heater was prepared in which first slits 60 and second slits 61 were alternately formed from mutually facing semicircular outer peripheries at substantially equal intervals, as shown in FIGS. 16(a) and 16(b). In this case, the number of each of the first slits and the second slits was 5. Furthermore, the number of the cells between each pair of slits was 6, and the distance from the tip of each slit to the outer periphery (the distance on a line extended from the slit) was set to 7 mm.

FTP Test

Figure 17:
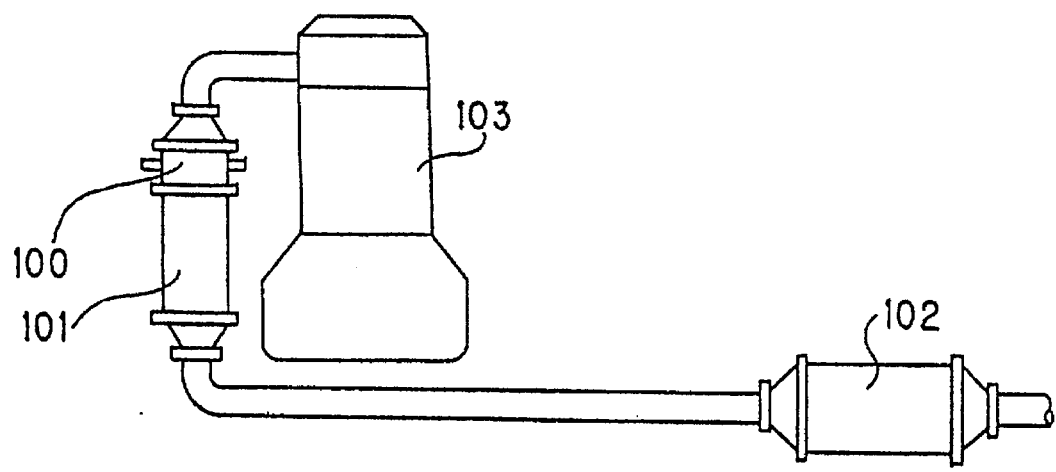
FIG. 17 is a schematic view of a manifold system used to evaluate the performance of the heaters in examples.

The thus obtained honeycomb heaters in Examples 1 to 10 and Comparative Example were used, and a light-off catalyst having a volume of 0.9 l was arranged immediately on the downstream side of each heater. Next, a main catalyst having a volume of 1.7 l was arranged on the further downstream side of the light-off catalyst to constitute an exhaust system shown in FIG. 17. In the drawings, reference numeral 100 was a honeycomb heater, numeral 101 was a light-off catalyst, 102 was a main catalyst, and 103 was an engine. This engine was an L4 type having a displacement volume of 2,000 cc.

The honeycomb heater, the light-off catalyst and the main catalyst were all exposed to a stoichiometric exhaust gas having an inlet temperature of 850° C., wherein fuel was cut for 5 seconds every one minute to deteriorate them in an accelerated fashion. The thus treated honeycomb heater, light-off catalyst and main catalyst were then used.

Bag emission was measured in accordance with FTP (federal test procedure) to evaluate cold start properties of the honeycomb heaters of the examples. During this measurement, secondary air was introduced into the exhaust system from the upstream side of the honeycomb heater at 120 l/min for 100 seconds from the start of the engine. Furthermore, electrification was given by the use of a constant-voltage generator, and voltage was regulated so as to obtain 1 kW value. An electrification time was 30 seconds after engine crank.

TABLE 1

| | FTP Performance (HC emission) | |
| --- | --- | --- |
| | Bag 1A* (g) | Bag 1 (g/mile) |
| Example 1 | 0.78 | 0.19 |
| Example 2 | 0.75 | 0.17 |
| Example 3 | 0.80 | 0.21 |
| Example 4 | 0.76 | 0.18 |
| Example 5 | 0.72 | 0.16 |
| Example 6 | 0.74 | 0.18 |
| Example 7 | 0.80 | 0.21 |
| Example 8 | 0.81 | 0.21 |
| Example 9 | 0.77 | 0.19 |
| Example 10 | 0.73 | 0.18 |
| Comp. Ex. | 0.86 | 0.25 |

*Bag 1A: The amount of HC exhausted for 140 seconds from the start of an engine.

What is claimed is:

1. A honeycomb heater, comprising:
   a honeycomb structure having an inlet end, an outlet end, an outer periphery, and a plurality of partition walls comprised of a conductive material and defining a plurality of passages extending from the inlet end to the outlet end, said passages extending parallel to a gas flow direction;

two electrodes connected to the honeycomb structure for electrification of the honeycomb structure; and a plurality of slits extending through the honeycomb structure to elongate a current flow path through the honeycomb structure between the electrodes, the slits being provided to define a plurality of first regions of partition walls and at least one second region of partition walls, the first regions being locally quickly heated with respect to the at least one second region upon electrification of the honeycomb structure and being spaced apart from each other by the at least one second region, wherein, in cross section, the first regions in total extend over an area of 5 to 50% of a total cross-sectional area of the honeycomb structure.

2. The honeycomb heater of claim 1, wherein the slits are positioned to provide said first regions.

3. The honeycomb heater of claim 1, wherein the length of the slits is modified to provide the first regions.

4. The honeycomb heater of claim 1, wherein spacing between adjacent slits is modified to provide the first regions.

5. The honeycomb heater of claim 1, further comprising a catalyst layer supported on the partition walls of the honeycomb structure.

6. The honeycomb heater of claim 1, wherein the first regions extend along the inlet end of the honeycomb structure.

7. The honeycomb heater of claim 1, wherein the outer periphery is cylindrical.

8. The honeycomb heater of claim 1, wherein the two electrodes divide the outer periphery of the honeycomb structure into first and second halves, said slits including at least two first slits that extend from the first half, through the partition walls, and terminate before reaching the second half, and at least two second slits that extend through the second half through the partition walls, and terminate before reaching the first half, the at least two first slits and the at least two second slits being alternately arranged.

9. The honeycomb heater of claim 1, wherein the two electrodes divide the outer periphery of the honeycomb structure into first and second halves, said slits including first slits that extend from the first half, through the partition walls, and terminate before reaching the second half, and second slits that extend through the second half, through the partition walls, and terminate before reaching the first half, the first and second slits being alternately arranged, wherein spacing between the first slits and the second slits is non-uniform to define the first regions.

10. The honeycomb heater of claim 9, wherein the first and second slits are arranged to provide relatively narrow portions between the first and second slits that define the first regions, the narrow portions being scattered through the honeycomb structure.

11. The honeycomb heater of claim 1, wherein the two electrodes divide the outer periphery of the honeycomb structure into first and second halves, said slits including first slits that extend from the first half, through the partition walls, and terminate before reaching the second half, second slits that extend through the second half, through the partition walls, and terminate before reaching the first half, the first and second slits being alternately arranged, and third slits intersecting at least one of the first slits and the second slits.

12. The honeycomb heater of claim 1, wherein said slits include a first slit that extends through a portion of the outer periphery of the honeycomb structure between the electrodes, from the substantial center of the honeycomb structure, and terminates before reaching an opposing portion of the outer periphery, second slits intersecting the first slit without cutting the outer periphery, and third slits extending through the outer periphery and not intersecting the first slit or the second slits.

13. The honeycomb heater of claim 12, wherein the second and third slits are spaced apart from each other to define therebetween the first regions.

14. The honeycomb heater of claim 1, wherein the wall thicknesses of the honeycomb structure in the first regions are different from those of the second region.

15. The honeycomb heater of claim 1, wherein the cell density of the honeycomb structure along the first regions is different than the second region.

16. The honeycomb heater of claim 1, wherein the honeycomb structure includes portions having partially broken partition walls.

17. The honeycomb structure of claim 1, further comprising an orifice extending from the outlet end through the partition walls and terminating before reaching the inlet end.

18. The honeycomb heater of claim 1, further comprising spaces extending from the outlet end through the partition walls and terminating before reaching the inlet end.

19. A honeycomb heater, comprising:

a honeycomb structure having an inlet end, an outlet end, an outer periphery, and a plurality of partition walls comprised of a conductive material and defining a plurality of passages extending from the inlet end to the outlet end, said passages extending parallel to a gas flow direction;

two electrodes connected to the honeycomb structure for electrification of the honeycomb structure; and a plurality of slits extending through the honeycomb structure to elongate a current flow path through the honeycomb structure between the electrodes, the slits being provided to define at least one first region of partition walls and a plurality of second regions of partition walls that are spaced apart from each by the first region, the first region being locally quickly heated with respect to the plurality of second regions upon electrification of the honeycomb structure, wherein, in cross section, the first region extends over and area of 5 to 50% of a total cross-sectional area of the honeycomb structure.

20. The honeycomb heater of claim 19, wherein said outer periphery is cylindrical, and said slits include a first slit that extends through the outer periphery to the center of the honeycomb structure, second slits intersecting the first slit at the center and extending radially outward without cutting the outer periphery, and third slits extending from the outer periphery radially toward the center, said third slits not intersecting the first slit or the second slits.

* * * * *